US010032169B2

(12) United States Patent
Essebag et al.

(10) Patent No.: US 10,032,169 B2
(45) Date of Patent: Jul. 24, 2018

(54) PREPAID, DEBIT AND CREDIT CARD SECURITY CODE GENERATION SYSTEM

(71) Applicant: ELLIPSE WORLD, INC., Culver City, CA (US)

(72) Inventors: Jacques Essebag, Uccle (BE); Sebastien Pochic, Schaerbeek (BE); Cyril Lalo, Los Angeles, CA (US)

(73) Assignee: ELLIPSE WORLD, INC., Culver City, CA (US)

( * ) Notice: Subject to any disclaimer, the term of this patent is extended or adjusted under 35 U.S.C. 154(b) by 0 days.

(21) Appl. No.: 15/810,704

(22) Filed: Nov. 13, 2017

(65) Prior Publication Data

US 2018/0068316 A1    Mar. 8, 2018

Related U.S. Application Data

(63) Continuation-in-part of application No. 15/230,989, filed on Aug. 8, 2016.

(51) Int. Cl.
*G06K 5/00*    (2006.01)
*G06Q 20/40*    (2012.01)
*G06Q 20/34*    (2012.01)

(52) U.S. Cl.
CPC ....... *G06Q 20/4018* (2013.01); *G06Q 20/341* (2013.01)

(58) Field of Classification Search
CPC ......... G06K 19/07749; G06K 19/0775; G06K 19/07775; G06Q 20/341
USPC ....................... 235/380, 492, 462.46, 472.02
See application file for complete search history.

(56) References Cited

U.S. PATENT DOCUMENTS

| 4,814,591 | A | 3/1989 | Nara et al. |
| 6,572,015 | B1 * | 6/2003 | Norton .................... B60R 25/02 |
| | | | 235/375 |
| 8,485,437 | B2 | 7/2013 | Mullen et al. |
| 9,183,490 | B2 | 11/2015 | Moreton et al. |

(Continued)

FOREIGN PATENT DOCUMENTS

| WO | 2010/022129 A1 | 2/2010 |
| WO | 2015/138976 A2 | 9/2015 |

OTHER PUBLICATIONS

World First: OT Announces availability of first payment card integrating dynamic security codes to secure online translations, Oberthur Technologies, Jun. 23, 2016.

(Continued)

*Primary Examiner* — Daniel St Cyr
(74) *Attorney, Agent, or Firm* — Thomas | Horstemeyer, LLP

(57) ABSTRACT

This invention is a comprehensive "Dynamic Security Code" ("DSC") System ("DSC System") that can change the security code of a prepaid, debit, or credit card ("Payment Card"). In an effort to thwart Card-Not-Present ("CNP") fraud, the DSC System provides dynamic security code values ("DSC Values") that have a limited use. The DSC Values provided by this DSC System can be calculated by various methodologies and can be used within existing standard payment card infrastructures. The DSC System can also be used with other form factors and in other environments not related to payments such as balance inquiries. The DSC Values can be calculated by a DSC Generator Server or on the card itself.

11 Claims, 6 Drawing Sheets

(56) References Cited

U.S. PATENT DOCUMENTS

| | | |
|---|---|---|
| 2002/0055822 A1* | 5/2002 | Amadeo .............. G06K 7/0095 |
| | | 702/38 |
| 2002/0139844 A1 | 10/2002 | Rachman et al. |
| 2006/0266831 A1* | 11/2006 | Kozlay ............ G06K 19/07345 |
| | | 235/451 |
| 2007/0260544 A1 | 11/2007 | Wankmueller |
| 2008/0126260 A1 | 5/2008 | Cox et al. |
| 2008/0283592 A1 | 11/2008 | Oder II et al. |
| 2011/0276380 A1 | 11/2011 | Mullen et al. |
| 2012/0286928 A1 | 11/2012 | Mullen et al. |
| 2012/0286936 A1 | 11/2012 | Mullen et al. |
| 2013/0299592 A1 | 11/2013 | Chiang |
| 2014/0117927 A1 | 5/2014 | Chateau et al. |
| 2014/0263624 A1 | 9/2014 | Guillaud |
| 2014/0279555 A1 | 9/2014 | Guillaud |

OTHER PUBLICATIONS

International Search Report and Written Opinion in co-pending, reated PCT Application No. PCT/IB2017/054774, dated Nov. 23, 2017.

International Search Report and Written Opinion in co-pending, reated PCT Application No. PCT/IB2017/054770, dated Nov. 29, 2017.

\* cited by examiner

PREPAID, DEBIT AND CREDIT CARD SECURITY CODE GENERATION SYSTEM

CLAIM OF PRIORITY

This application is a continuation-in-part of application Ser. No. 15/230,989, filed Aug. 8, 2016, which is incorporated by reference herein in its entirety.

FIELD OF THE INVENTION

This invention provides a system for generating and updating security codes for use with prepaid, debit and credit cards. Specifically, in some embodiments, among others, prepaid, debit and credit card security codes can be updated by a server connected to a network or by an on-card algorithm such that when the card is used with a Delivery Device, new security code(s) are generated for future transactions.

BACKGROUND

Some payment transactions are made without a payment card, such as a debit or credit card, being read by a payment device. For example, this can happen when purchasing goods from an electronic retailer. Cardholders make these so-called Card-Not-Present ("CNP") transactions by giving their payment credentials, such as the Primary Account Number ("PAN"), Expiration Date, and security code, to a merchant (e.g., an electronic retailer) without physically presenting the card to that merchant, as opposed to Card-Present transactions where a card is swiped, dipped, or tapped (typically by the cardholder) on a payment device to read the card data and initiate an electronic payment transaction.

CNP fraud can occur when valid credentials of a payment card are stolen from the genuine cardholder and then used by an unauthorized person to perform a payment transaction. These credentials can be stolen when computer systems (e.g., merchant accounts systems) are hacked. Theft of card credentials can also occur when unscrupulous individuals record card data while processing a payment and before returning the card to the cardholder. For example, an employee of a restaurant could write down the information printed on the plastic card of a patron while processing the payment.

Payment card companies use various security codes to combat fraud. Security codes, such as the Card Validation Code 2 ("CVC2") and the Card Verification Value 2 ("CVV2"), were introduced by payment card companies specifically to address CNP fraud. These security codes are used as simple static passcodes to help ensure the genuine card is present at the moment of a CNP transaction. These codes can be printed on the back of a card (e.g., on the card's signature panel), but they can also be printed on the front of the card.

Although thieves are now forced to copy an additional piece of information to be able to perform fraudulent transactions, the last few years have seen ever growing levels of CNP fraud. This happened despite the attempts of most of the payment card companies to secure these security codes (e.g., by printing them on the back of the card to force thieves to copy both side of the card, by making the imprint difficult to read from a certain distance, or by forbidding merchants from storing those security codes on their systems, even temporarily).

In addition to the direct cost of fraudulent transactions, CNP fraud generate additional costs related to the management of fraud cases by issuers and merchants, and also by forcing issuers to issue new cards as a replacement for the counterfeited ones.

There already exist cards that can change their security code on a regular basis. These time-based products use a built-in electronic circuit with a real-time clock and a battery to calculate a new security code after a pre-determined length of time and show it on an electronic display embedded in the card. However, these solutions have a number of drawbacks: the real-time clock and the battery make the cards more fragile, the battery makes the card more expensive and limits its lifetime, and the time-based mechanism using the on-card clock makes it prone to de-synchronization with the server. Therefore, a need exists for a solution that allows for the security codes on cards to be changed during the lifetime of the cards that is cheaper, more robust, and more reliable than existing solutions.

The benefits of such a solution would be two-fold: first, keeping a solution based on security codes would avoid the need to change or replace the existing card payment infrastructure; second, changing the value of these security codes significantly decreases the possibility of fraudulent activity.

SUMMARY

This invention is a comprehensive "Dynamic Security Code" ("DSC") System ("DSC System") that can change the security code of a prepaid, debit, or credit card ("Payment Card"). In an effort to thwart Card-Not-Present ("CNP") fraud, the DSC System provides dynamic security code values ("DSC Values") that can have a limited use. When needed, another DSC Value will be generated by a DSC Generator Server on a network or generated by the microprocessor embedded in the DSC card. The DSC card can also be used with existing standard payment card infrastructures. In addition, the DSC System can be used with other form factors and in other environments not related to payments such as balance inquiries.

When a DSC Value needs to be validated by the Issuer, it can be sent to the Issuer's DSC Validator Server ("DSC Validator Server") using the same channels as the ones used for traditional static security codes. For example, when a Cardholder uses a web browser to manually enter the DSC Value in lieu of the static security code into the electronic form provided by a merchant or into the registration form provided by an online or mobile wallet provider.

In one embodiment of the invention, DSC Values are generated by a DSC Generator Server. When needed, the DSC Generator Server will calculate one or more new DSC Values for a specific DSC Card. Examples include, but are not limited to the Issuer's EMV authorization processing performed during a payment transaction, a purchase transaction, a purchase transaction with cash advance, an account status inquiry, a PIN change transaction, a cash withdrawal. However, it could also be done during a card management transaction or any other interaction between the DSC Card and the Issuer.

When DSC Values are generated by a DSC Generator Server, they can be delivered to the DSC Card by embedding them in an EMV script contained in the Issuer's authorization response message, but the DSC Values could also be sent in other types of messages during any other interaction between the DSC Card and the Issuer.

In another embodiment of this invention, DSC Values are generated by the DSC Card itself. When needed, the DSC Card will calculate one or more new DSC Values. Typically, this can be done when the DSC Card is processing an EMV transaction in a POS or ATM terminal.

In other embodiments of this invention, a card is designed to conduct transactions without an internal electrical battery power source. Electrical power is received by the card from an external electrical power source when the card is interfaced to the power source during a contact or contactless transaction. In these embodiments, the card has an electronic bistable display designed to display a security code when the card is without an external electrical power source. The security code on the card (such as numerical or alphanumerical codes, symbols, or QR codes) can still be used for other transactions (such as card-not-present, authentication, or ticketing) without an external electrical power source.

Other embodiments, systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE DRAWINGS

The components in the figures are not necessarily to scale, emphasis being placed instead upon illustrating the principles of the invention. In the figures, like reference numerals designate corresponding parts throughout the different views.

DETAILED DESCRIPTION

Figure 1:
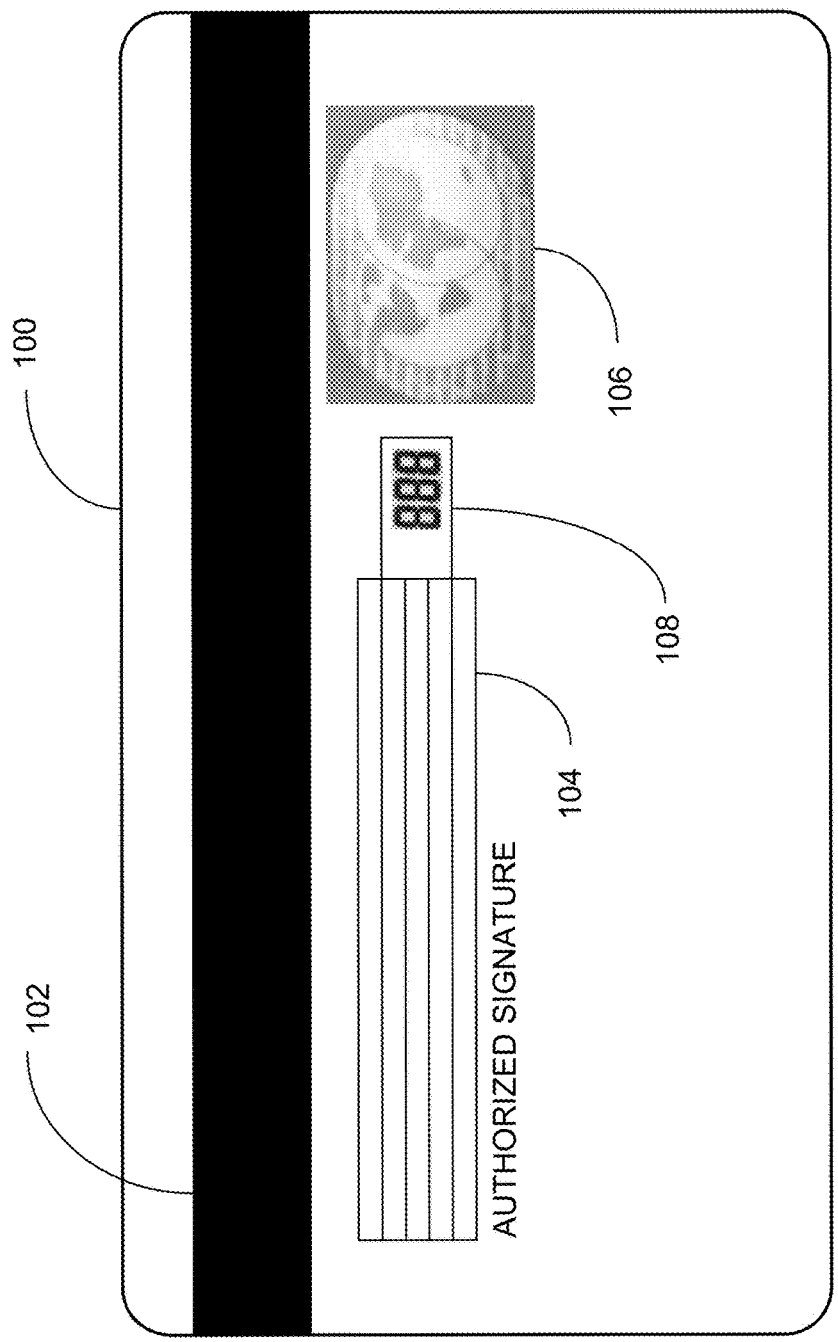
FIG. 1 is a side view of a card illustrating visible aspects of one side of a typical prepaid, debit or credit card.

This invention is a comprehensive "Dynamic Security Code" ("DSC") System ("DSC System") that can change the security code of a prepaid, debit, or credit card ("Payment Card"). In an effort to thwart Card-Not-Present ("CNP") fraud, the DSC System provides dynamic security code values ("DSC Values") that have a limited use. The DSC Values provided by this DSC System can be calculated by various methodologies and can be used within existing standard Payment Card infrastructures. The DSC System can also be used with other form factors and in other aspects not related to payments such as balance inquiries.

In existing systems that use security codes with static values, the bank or other institution issuing a Payment Card ("Issuer" or "Card Issuer") provides the static value of a card's security code only once to its holder ("Cardholder") such as by printing it on the back or front of the plastic card. With the DSC System, new DSC Values can be calculated by a DSC Generator Server ("DSC Generator Server") and delivered to a card ("DSC Card") when it is communicating with the Issuer, or they can be calculated by the DSC Card itself.

When a DSC Value needs to be validated by the Issuer, it can be sent to the Issuer's DSC Validator Server ("DSC Validator Server") using the same channels as those used for traditional static security codes. For example, when a Cardholder uses a web browser to manually enter the DSC Value in lieu of the static security code into the electronic form provided by a merchant or into the registration form provided by an online or mobile wallet provider.

In one embodiment of the invention, DSC Values are generated by a DSC Generator Server. When needed, the DSC Generator Server will calculate one or more new DSC Values for a specific DSC Card. Examples include, but are not limited to the Issuer's EMV authorization processing performed during a payment transaction, a purchase transaction, a purchase transaction with cash advance, an account status inquiry, a PIN change transaction, a cash withdrawal. However, it could also be done during a card management transaction or any other interaction between the DSC Card and the Issuer.

When DSC Values are generated by a DSC Generator Server, they can be delivered to the DSC Card by embedding them in an EMV script contained in the Issuer's authorization response message, but the DSC Values could also be sent in other types of messages during any other interaction between the DSC Card and the Issuer.

In another embodiment of this invention, DSC Values are generated by the DSC Card itself. When needed, the DSC Card will calculate one or more new DSC Values. Typically, this can be done when the DSC Card is processing an EMV transaction in a POS or ATM terminal.

There are multiple algorithms that can be used to generate DSC Values and they can encompass various forms of data, such as system configuration data, card data, and transaction data. In all embodiments of this invention, including when the DSC Validator Server supports several algorithms, the generation and the validation of DSC Values should be done with the same algorithm.

In all embodiments where the generation of DSC Values is done while performing other card-related processing, this generation should not be tied to the outcome of that specific processing. For example, if the generation of DSC Values is done during the processing of an EMV transaction, these values can be delivered to the DSC Card, whether the transaction is accepted or declined.

A Delivery Device may mean any electronic device capable of transmitting power and data to a DSC Card. This can be done through standard interfaces compliant with IS 7816 ("Contact Interface"), IS 14443, IS 15693, IS 18092, IS 21481 ("Contactless Interface"), or any other interface supported by the DSC Card. Examples of a Delivery Device include, but are not limited to an EMV Point-of-Sales ("POS") terminal, an EMV Automated Teller Machine ("ATM") terminal, an EMV Cardholder Activated Terminal ("CAT"), an EMV Automated Fuel Dispenser ("AFD") terminal, a smartphone or mobile device with NFC capabilities (whether built-in or through the use of an add-on), a dedicated bank branch terminal, a personal computer (e.g., desktop, laptop, or tablet) equipped with a contact or contactless chip card reader (whether built-in or through, the use of an add-on), a turnstile, a ticket validator.

When used on a Delivery Device, a DSC Card can update its display using a DSC Value received from the DSC Generator Server, stored in the DSC Card's memory, or generated on the DSC Card itself. Based on their preferences, Issuers can decide on different update strategies. For example, Issuers may decide to have the DSC Card update its display each time it is used on a Delivery Device or for a certain type of transaction, or based on more complex decision criteria using contextual information including, but not limited to card state, transaction data, risk management considerations.

In one embodiment of this invention, a DSC Value can be used for a CNP transaction next to other card credentials, such as the PAN and Expiry Date, in lieu of a static security code. The DSC Validator Server will then validate the DSC Value and share the outcome of the validation with the Issuer's system as part of the CNP transaction processing.

In another embodiment, a DSC Value can be used as part of a regular Card-Present transaction. For example, in a consumer electronics store, as an additional security step of the transaction. Similarly to the CNP case, the DSC Value will be validated by a DSC Validator Server.

In all embodiments, DSC Values can be transmitted to the DSC Validator Server using the same channels and interfaces as the ones used to transmit the regular static security codes, such as the Card Validation Code 2 and the Card Verification Value 2.

FIG. 1 is a side view illustrating visible aspects of one side of a DSC Card 100 that may have the outward appearances of a traditional Payment Card with a PAN, Expiration Date, name of an individual, company printed on the card. The DSC Card 100 may also have a logo of card issuer, an issuing bank, merchant, etc. (not shown.) Also located on the DSC Card 100 may be a magnetic stripe 102, a signature area 104, a hologram 106, a display 108, or printed card issuer contact information (not shown.) However, with the exception of the display 108, internal electronic hardware may be hidden within laminated sheets of plastic, metal, or any other types of material.

On prior art Payment Cards, a security code may be printed on the card. For DSC Cards 100 that can change their security codes, a display 108 may be incorporated into the laminated structure of the card. For optimum results, this display 108 may be flexible, such as an electronic paper display, so that it can handle the stresses generated by card use, while also having the capability of displaying different codes or information related to the card and its use. The display 108 may be configured for one or more digits and may support the use of characters as part of the security code or information displayed to the cardholder.

Figure 2:
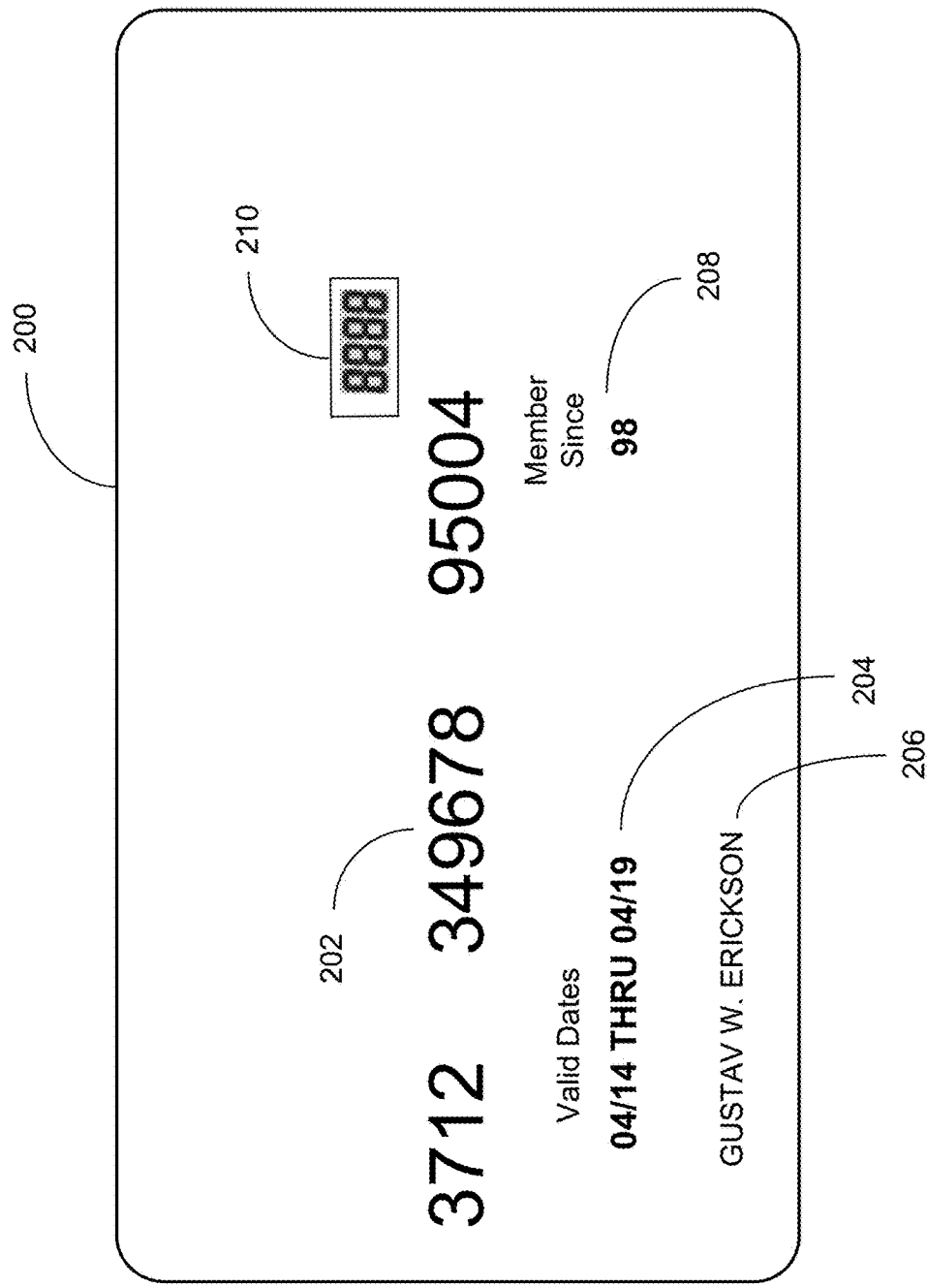
FIG. 2 is a side view of a card illustrating visible aspects of card data on one side of a prepaid, debit or credit card.

FIG. 2 is a side view of a DSC Card illustrating visible aspects of card data on one side of a Payment Card. Some DSC Cards 200 show the card data on one side of the card. In this embodiment, the PAN 202, the validity date range or expiration date 204, and/or the Cardholder's name 206 can be listed on one side of the card. In addition, less critical information such as the starting date 208 the cardholder started with a particular card issuer may also be listed. Likewise, on the same side of the DSC Card 200, a security code field 210 may be shown in a flexible display such as an electronic paper display so that it can handle the stresses generated by card use. Once again, the display 210 may be configured for the display of one or more digits and may support the use of characters as part of the security code or information displayed to the cardholder.

Figure 3:
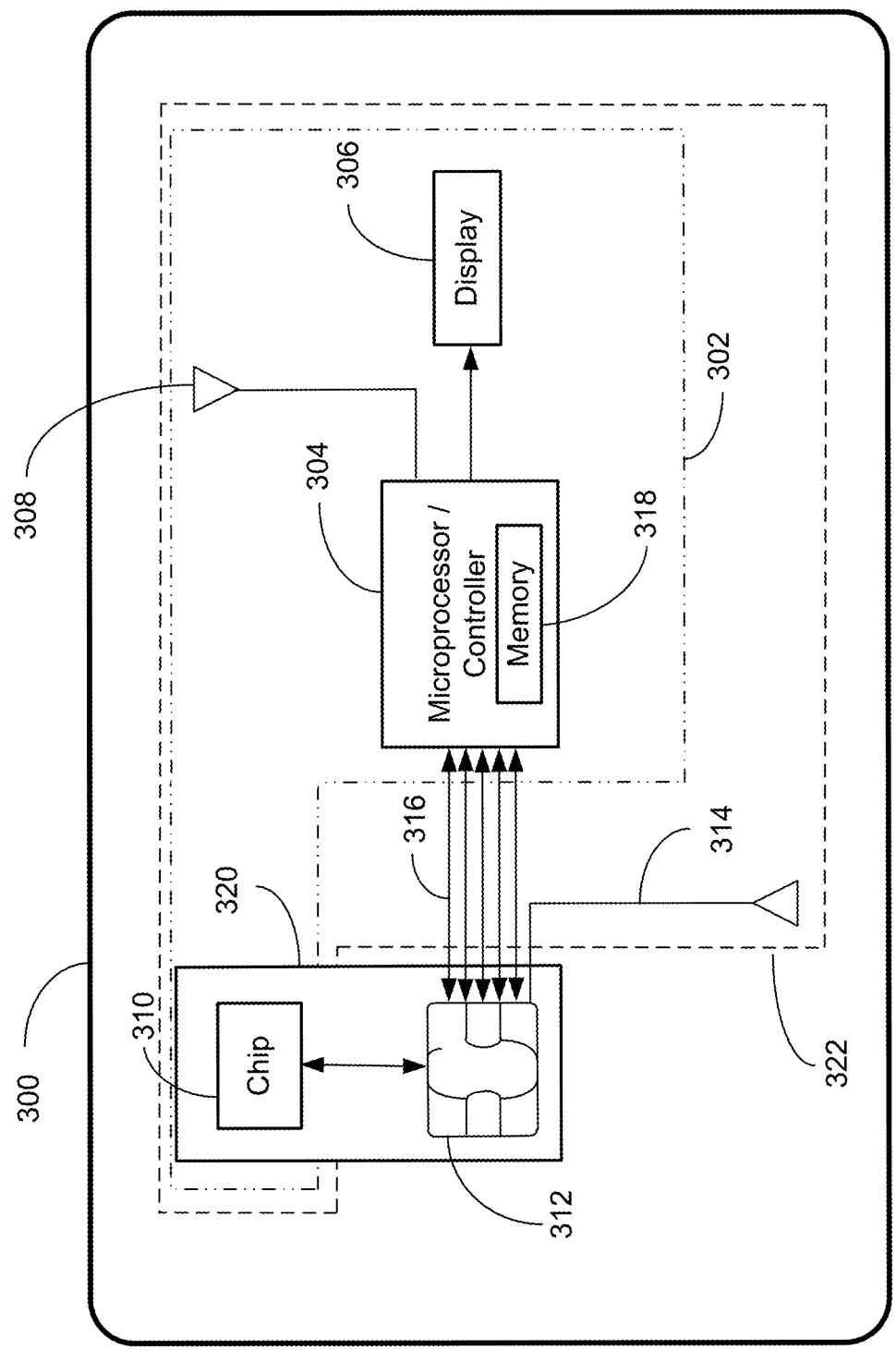
FIG. 3 is a block diagram of the internal hardware components in a prepaid, debit or credit card that can receive periodic updated security code information.

FIG. 3 is a block diagram illustrating the internal hardware components of a DSC Card 300. The DSC Card 300 can have a Flexible Printed Circuit ("FPC") 302. The FPC module 302 can have a microprocessor 304, a display 306, a first antenna 308, and potentially other electronic components including but not limited to resistors and capacitors.

The microprocessor 304 may alternatively be a microcontroller. Also, the microprocessor's functionality may be performed by an embedded secure chip 310 that can be either a secure microcontroller or equivalent processing capabilities with internal memory or access to a memory location (not shown). Likewise, the functionality performed by the microprocessor 304 may be implemented with multiple hardware components.

A memory storage area embedded within the microprocessor 304 may store information for the DSC Card 300 or the memory location may be an off chip memory area that is connected to the microprocessor 304. Also connected to the microprocessor 304 is a display 306. The display 306 may be constructed of a material that allows the display to flex when the DSC Card 300 is bent without causing the display to fail. The DSC Card 300 may be configured so data other than DSC Values may be shown on the display 306, such as a one-time password, the financial balance of the card available to the cardholder, an error message, the number of electronic tickets or vouchers remaining, or other messages providing information to the cardholder.

The card is designed to conduct transactions without an internal electrical battery power source. Electrical power is received by the card from an external electrical power source when the card is interfaced to the power source during a contact or contactless transaction and enables the card, in a first stage, to generate or receive data to update the display. Preferably, the display 306 is an electronic bistable display designed to display the data (e.g., dynamic security code, ticket balance, amount balance, proof-of-fare, expiration date, or entitlements) when the card is without an external electrical power source. The data on the bistable display (such as numerical or alphanumerical codes, symbols, or QR codes) can still be used at a later stage for other transactions (such as card-not-present payments, authentication, hospitality, physical access control, or ticketing) or for cardholder informational purposes without an external electrical power source.

The microprocessor 304 may also be connected via a plurality of electrical connections and/or communication buses 316 to the embedded secure chip 310 thus allowing for the transfer of power and data. Currently, five electrical connections and/or communication buses 316 link the embedded secure chip 310 to the microprocessor 304 (e.g., two connections are for power, two are for data, and one is for a reset function).

The FPC 302 inside the DSC Card 300 can be assembled into a thin flexible package called a prelaminate 322 (i.e., card state prior to lamination). The prelaminate 322 is typically a sheet of plastic (or metal, composite material, or any other material) that can be laminated between two sheets of plastic, metal, composite, or any other material to form the final version of the DSC Card 300. The prelaminate 322 can include the FPC 302, a second antenna 314, electrical connections 316, an embedded secure chip 310, and other components of the DSC Card 300. The DSC card can be formed from a FPC 302 encapsulated between two laminated blanks formed from plastic materials, composite materials, metal, metal alloys, or ceramic materials.

When the Contact Interface of the DSC Card 300 is used with a Delivery Device ("Contact Mode"), the DSC Card 300 receives its power and can transmit and/or receive data via the ISO contact plate 312 that connects the Delivery Device and the DSC Card's embedded secure chip 310. The embedded secure chip 310 and ISO contact plate 312 can be assembled into a package called a module 320. The contact connection between the DSC Card's embedded secure chip 310 and the Delivery Device can also provide the pathway for the transmittal and reception of data between the Delivery Device and the FPC 302.

When the Contactless Interface of the DSC Card 300 is used with a Delivery Device ("Contactless Mode"), the DSC Card 300 receives it power and can transmit and receive data via one or more antennae. In one embodiment, only one antenna, 308 or 314, may be used to provide power to the FPC 302. The same antenna 308 or 314 may also provide the communication path for exchange of data between the Delivery Device and the FPC 302. In another embodiment, both antennae 308 and 314 can be used to provide power and/or the communication path for the exchange of data between the Delivery Device and the FPC 302.

In all embodiments, and for both the Contact and Contactless Modes, the DSC Card 300 is powered by a power source that is not embedded within the DSC Card 300. Typically, this power source is the Delivery Device.

In all embodiments where new DSC Values are generated by a DSC Generator Server, and for both the Contact and Contactless Modes, the new DSC Values are transmitted to the DSC Card 300 by a Delivery Device (e.g., in an EMV Script Tag 71 or 72, or some other suitable transport mechanism). During a transaction in Contact Mode, the DSC Values are received through the Delivery Device and the ISO Contact Plate 312 connection. During a transaction in Contactless Mode, the DSC Values are received via the first antenna 308 and/or second antenna 314.

In one embodiment, the DSC Card 300 itself can generate new DSC Values. When the DSC Card 300 is powered by a Delivery Device, for both the Contact and the Contactless Modes, the microprocessor 304 can generate one or more new DSC Values by using a predefined algorithm and input data coming from a memory location 318 accessible by the embedded secure chip 310 or microprocessor 304 (e.g., cryptographic keys, card credentials, payment application data, and/or configuration data) and/or data coming from the Delivery Device. Microprocessor 304 can handle the functionality of the embedded secure chip 310, the security code generation and the display driver in either a single chip or dual chip architecture. Based on their preferences, Issuers can decide on different strategies. For example, Issuers may decide to have the DSC Card generate one or more new DSC Value(s) each time it is used on a Delivery Device or a certain type of transaction is processed, or based on more complex decision criteria using contextual information including but not limited to card state, transaction data, risk management considerations.

In all embodiments, and when the DSC Card 300 is used with a Delivery Device to perform additional processes (e.g., to process an EMV transaction) the generation of new DSC Values should not depend on the outcome of these additional processes (e.g., new DSC Values can be generated even when an EMV payment transaction is declined or when the EMV payment transaction is approved by an offline terminal.)

In all embodiments of the DSC Card 300, DSC Values— whether generated by a DSC Generator Server or by the DSC Card 300 itself—are stored in a memory location on the embedded secure chip 310 and/or in a memory location 318.

In all embodiments, and when the DSC Card 300 is used with a Delivery Device to perform additional processes (e.g., to process an EMV transaction) the storage of new DSC Values should not depend on the outcome of these additional processes (e.g., new DSC Values can be stored even when an EMV payment transaction is declined or when an EMV transaction is approved by an offline terminal)

Based on their preferences, Issuers can decide to issue the DSC Card 300 with or without the first DSC Value(s) stored into the card's memory. If the DSC Card 300 is issued without any DSC Value, the first DSC Value(s) can be delivered when the DSC Card 300 is used for the first time by the Cardholder with a Delivery Device. If the DSC Card 300 is issued with one or more initial DSC Values, these DSC Values can be loaded into the DSC Card's memory when it is personalized by the Issuer or personalization bureau.

Once the DSC Card 300 is issued, the antennae 308 and/or 314 may be used to download and update the firmware of the microprocessor 304 or embedded security chip 310, download updated algorithms for calculating the DSC Values, resynchronize the card with the card Issuer's network, or download an updated list of DSC Values into the DSC Card's memory.

DSC Value(s) stored in the DSC Card's memory, whether generated by a DSC Generator Server or by the DSC Card itself, can be encrypted. Cryptographic key(s) stored into the DSC Card's memory, whether used to generate new DSC Values or to encrypt and decrypt stored DSC Values, can be encrypted.

DSC Value(s) can be stored into devices with a form factor that is not compliant with the IS 7810's ID-1 format. Examples include other card form factors but also non-card form factors including but not limited to hardware tokens, key fobs, wearable devices (such as a health monitoring device), mobile applications running on smartphones. Similarly, these other form factors can also be used to generate new DSC Values.

The functionality of the DSC Server described in this invention comprises of at least two modules, the generation and delivery of new DSC Values by the DSC Generator Server and the validation of DSC Values by the DSC Validator Server. The two modules may operate on the same system or may be split and operate on separate systems. The DSC Generator Server and/or the DSC Validator Server can be operated by the Issuer or by third parties, on in-house systems and/or hosted systems.

Figure 4:
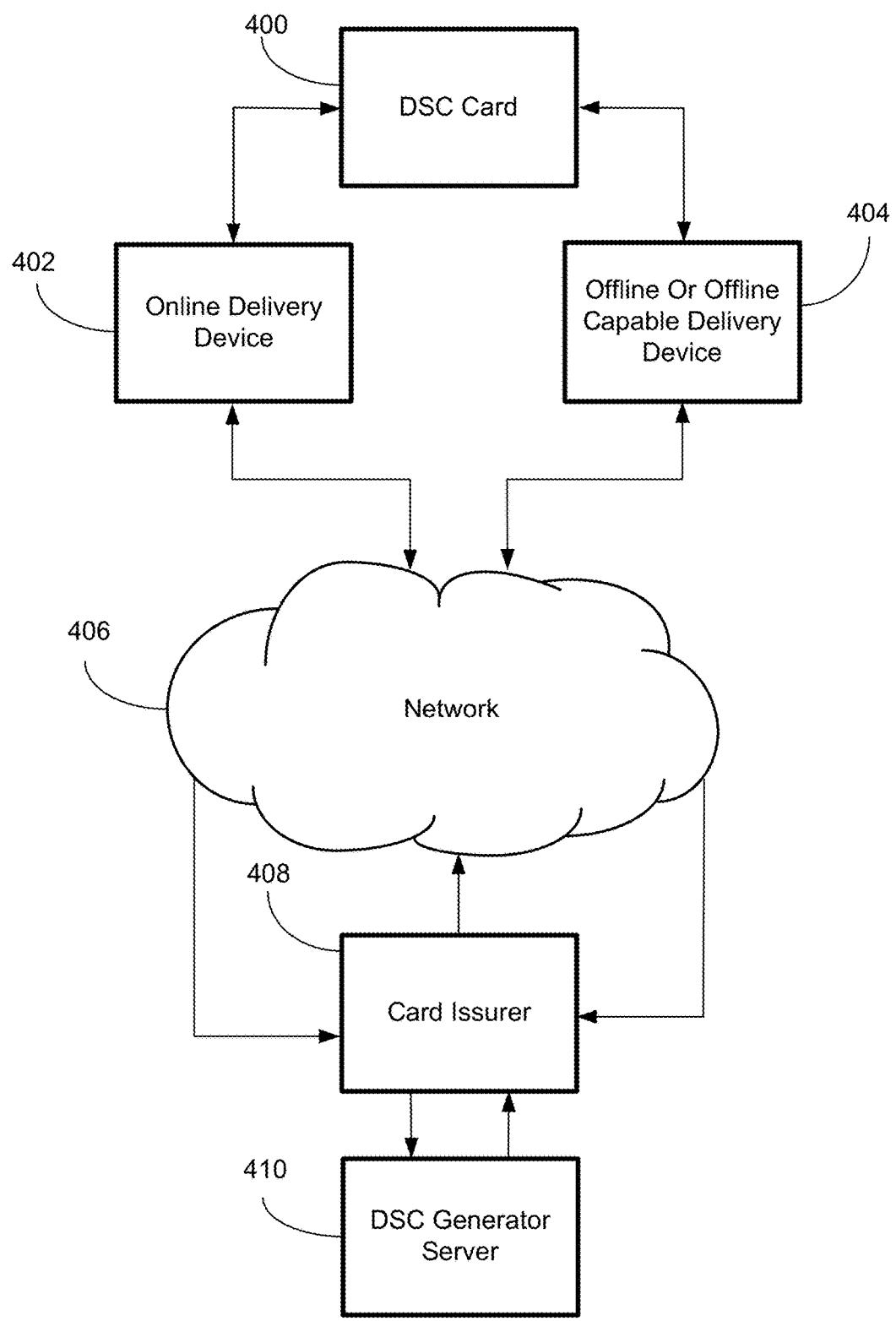
FIG. 4 is a flow chart of data movement in a prepaid, debit or credit card transaction where the security code is periodically updated.

FIG. 4 is a flow chart of data movement in a Payment Card transaction where the DSC Value(s) can be updated based upon the occurrence of certain events, including but not limited to an online authorization request, an online PIN change or card management transaction, a cash withdrawal. As an example implementation, a DSC Card 400 utilizes the EMV standard so that the DSC Card 400 is operable on an Online Delivery Device 402, such as a Point-Of-Sales ("POS") Terminal and/or ATM terminal. Payment transaction data processed by the Online Delivery Device 402 can be sent across the network 406 (including but not limited to a payment service provider, an acquirer, a processor, a card scheme network) to a card Issuer 408. Typically, payment transactions include but are not limited to data needed to request a transaction approval, a balance inquiry such as when the card is presented to an ATM terminal. In this invention, the DSC Card 400 can also use a payment transaction to send information about its state (including but not limited to what is showed on its electronic display, what is stored in its storage memory) back to the DSC Generator Server 410. The card Issuer 408 can approve or deny the payment transaction or the card information inquiry to the Cardholder. During the transaction processing, one or more new DSC Value(s) may be generated by the DSC Generator Server 410 and transmitted back though the network 406

(e.g., in an EMV script) to the Online Delivery Device 402. The Online Delivery Device 402 then sends the new DSC Values(s) to the DSC Card 400 for storage and/or display. After the DSC Card 400 has updated its display, it may send a message across the network 406 and back to the Issuer 408 to confirm the update of the display. This confirmation message can transmit additional data including but not limited to the actual value that has been displayed, a reference value of the value that has been displayed, the value stored in its storage memory.

As another example implementation, a DSC Card 400 utilizes the EMV standard so that the DSC Card 400 is operable on an Offline or Offline-Capable Delivery Device 404, such as a POS Terminal. Payment transaction data processed by the Offline or Offline-capable Delivery Device 404 are not sent online through the network 406. Rather, the payment transaction is authorized locally by the Offline or Offline-Capable Delivery Device 404 and the Payment transaction data may be stored in a memory location on the Offline or Offline-Capable Delivery Device 404 and later transmitted through the network 406 to the Issuer 408 for updating its transaction records and the DSC Validator records. In this implementation, no new DSC Values(s) are generated by the DSC Generator Server 410 because the DSC Card 400 will not be in communication with the card Issuer 408. However, if capable, the DSC Card 400 could generate, store, and display new DSC Value(s) or display a stored DSC Value when operated on an Offline or Offline-Capable Delivery Device 404.

Based on their preferences, Issuers can decide on different strategies. For example, Issuers may decide to have the DSC Generator Server 410 generate one or more new DSC Value(s) each time it is communicating with a DSC Card 400 or a certain type of transaction is processed, or based on more complex decision criteria using contextual information including but not limited to card state, transaction data, risk management considerations.

In another embodiment, Issuers can have offline Delivery Devices query the DSC Card 400 regarding the number of DSC Value(s) remaining in a stored list in the Card 400. If the number of DSC Value(s) stored in memory on the Card 400 are at or below a predetermined number (e.g., one, two or more based on the Issuers' preference), the Delivery Device 404 can be forced to go online so that an additional DSC Value or DSC Values can be downloaded by the DSC Generator Server 410.

Figure 5:
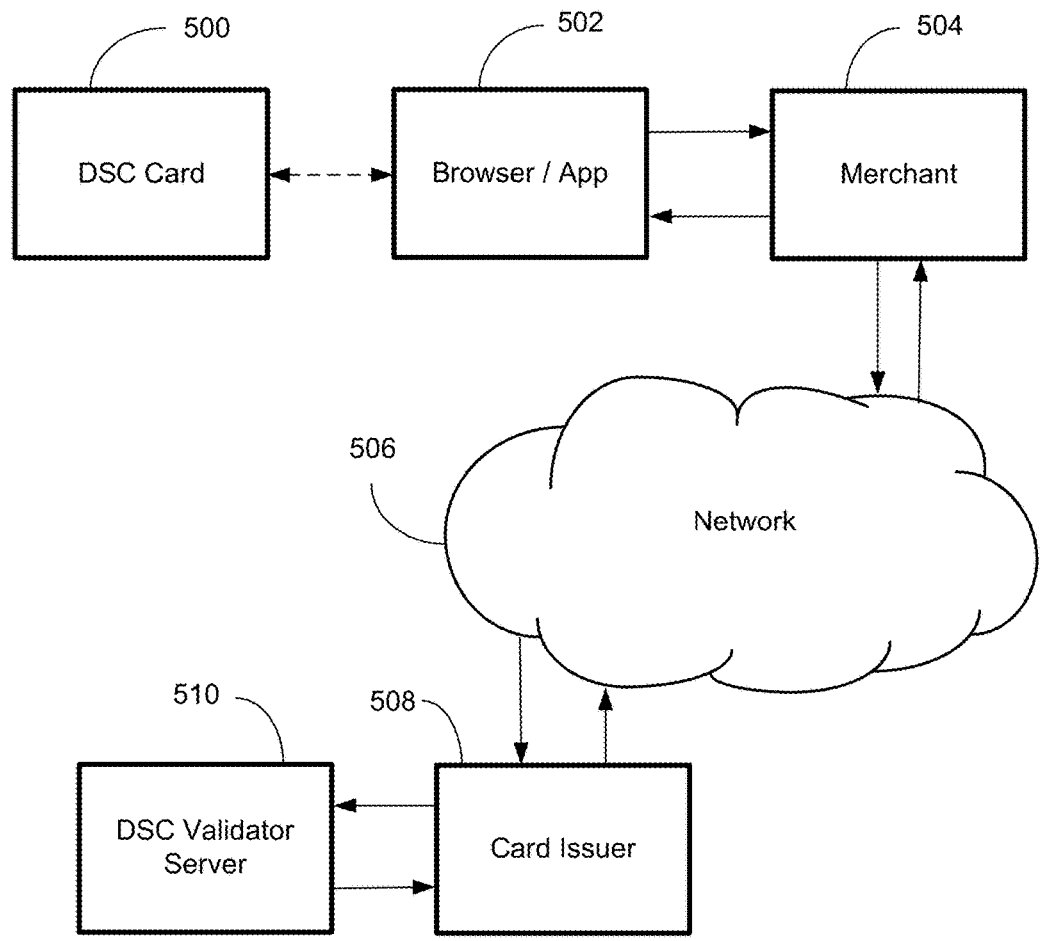
FIG. 5 is a flow chart of data movement in a prepaid, debit and credit card transaction in a Card-Not-Present operating environment.

FIG. 5 is a flow chart of data movement in a CNP transaction. In such an operating environment, the chip of the DSC Card 500 is not used and instead the Cardholder enters their card information (this includes but it not limited to the PAN, the expiration date, the Cardholder name, the DSC Value displayed by the DSC Card 500) on a mobile device, laptop, or desktop. In such CNP transactions, the cardholder can input the card data into a browser or app 502 that connects to a merchant 504. The Payment Card transaction information is sent through a network 506 to a card Issuer 508.

In a CNP payment transaction, the DSC Value received by the Issuer 508, in lieu of the regular static security code, is validated by the DSC Validator Server 510. The DSC Validator Server 510 can provide different types of answers to the Issuer 508, depending on the type of DSC Value validation that is performed. For example, the DSC Validator Server 510 could provide a simple binary answer (i.e., the DSC Value is correct or not correct) or a more complex answer to the Issuer 508 (e.g., the DSC Value is contained within an acceptable range). The DSC Validator Server 510 can also respond with the regular static security value associated with the DSC Card 500's PAN and Expiry Date, and that can be used to substitute the DSC Value in the authorization request message. Once the card Issuer 508 authorizes a transaction, the transaction authorization response is transmitted back though the network 506 and on through to the merchant 504. The merchant can then alert the Cardholder via the browser/application 502 that the transaction was authorized or denied. Once the payment transaction is authorized, the Issuer 508 can recognize that the transaction was a CNP transaction and no new DSC Value is generated since the DSC Card 500 is not in communication with the Issuer 508. Similarly, the DSC Card 500 cannot generate new DSC Value(s) since it is not being used on a Delivery Device.

Figure 6:
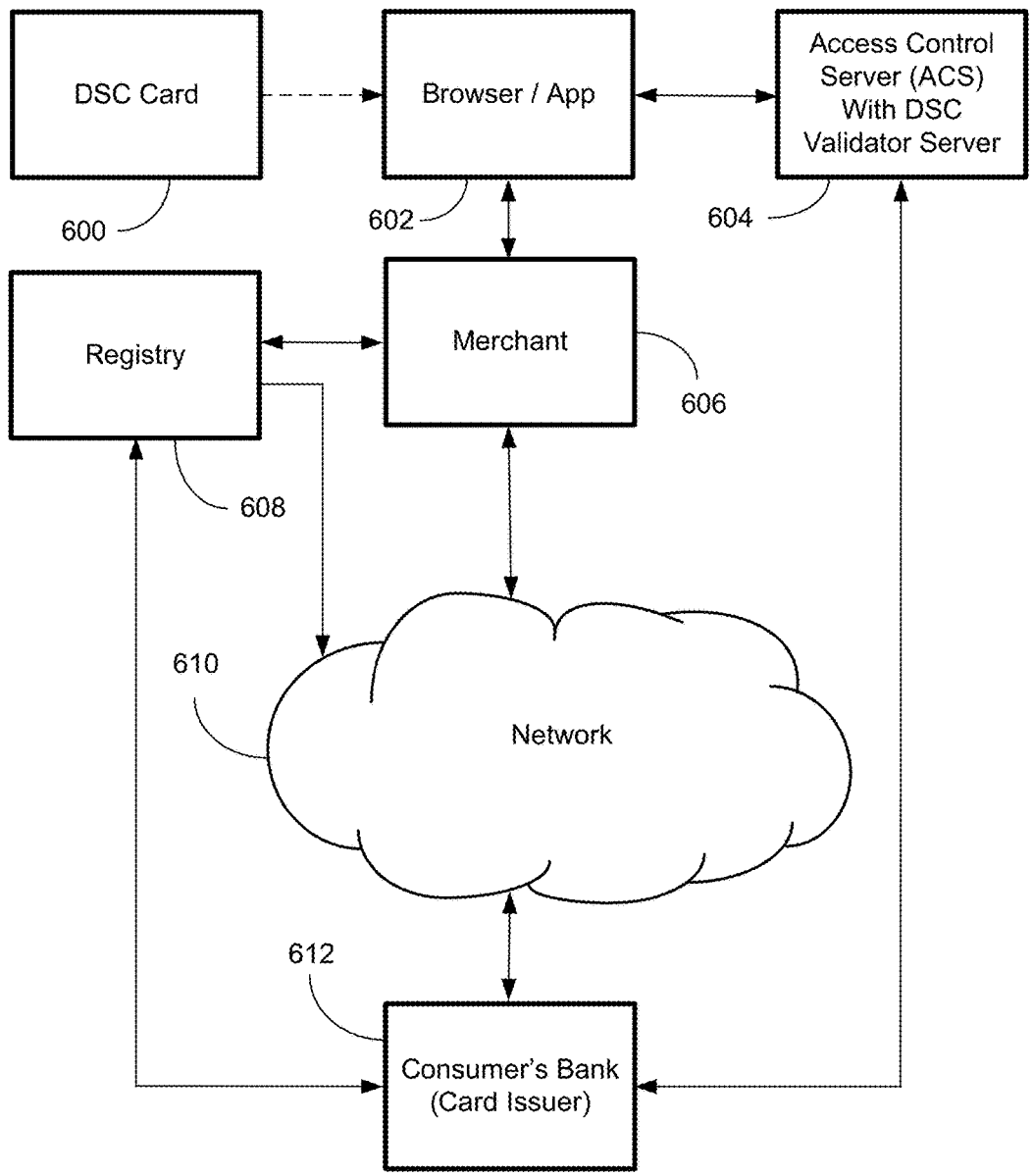
FIG. 6 is a flow chart of data movement in prepaid, debit and credit card transactions with the 3D secure functionality.

FIG. 6 is a flow chart of data movement in a CNP transaction using 3-D Secure ("3DS") functionality. DSC Card 600 information is typed into a browser or online application 602 when the cardholder uses a DSC Card 600 to conduct a CNP transaction. The Merchant 606 can check with the Registry 608 whether the DSC Card 600 supports the 3DS functionality. The Merchant 606 also transmits payment transaction data that involves a request for transaction approval. The Registry 608 is in communication with the Merchant 606, network 610 and/or Issuer 612. If 3DS is not supported, the transaction is processed as described in FIG. 5. If 3DS is supported, the Merchant 606 redirect the browser or online application 602 to the Access Control Server 604. The Access Control Server 604 ("ACS") can implement a DSC Validator Server as part of 3DS' Cardholder Authentication step. Programs such as Verified By Visa and MasterCard SecureCode are examples of the implementation of the 3DS technology. The ACS 604 is in communication with the Issuer 612.

When 3DS transactions are approved or denied, the card Issuer 612 does not generate any new DSC Value(s) as the transaction was previously identified as a CNP transaction and there is no connection to upload any new DSC Value(s) onto the DSC Card 600.

While various embodiments of the invention have been described, it will be apparent to those of ordinary skill in the art that many more embodiments and implementations are possible that are within the scope of this invention.

At least the following is claimed:
1. A card for conducting transactions in connection with delivery devices, the card comprising:
   an electronic bistable display, the electronic bistable display designed to maintain displayed data when the card is without an external electrical power source;
   a microprocessor electrically coupled to the electronic bistable display;
   an embedded secure chip electrically coupled to the microprocessor;
   a first antenna coupled to a circuit associated with the microprocessor and the electronic bistable display, the first antenna designed to interface with the external electrical power source of a delivery device during a contactless transaction to receive electrical power for operating the circuit associated with the microprocessor and the display;
   a second antenna coupled to the embedded secure chip, the second antenna designed to both (a) interface with the external electrical power source of the delivery device to receive electrical power for operating a circuit associated with the embedded secure chip during the contactless transaction and (b) interface with an external data source of the delivery device to communicate data during the contactless transaction and to change the displayed data;

wherein the card has no internal electrical battery power source; and wherein the displayed data that is visible on the electronic bistable display when the card is interfaced with the external electrical power source of the delivery device can be used at a subsequent time for validating a subsequent transaction when the card is no longer interfaced with the external electrical power source and until the card is subsequently interfaced with the external electrical power source and the external data source of the delivery device or another delivery device.

2. The card of claim 1, further comprising an ISO contact plate coupled to the embedded secure chip and the circuit associated with the microprocessor and the display, the ISO contact plate designed to both (a) interface with the external electrical power source to receive electrical power for operating the microprocessor, the display, and the embedded secure chip during a contact transaction and (b) interface with the external data source to communicate data during the contact transaction.

3. The card of claim 1, where the card is a key fob.

4. The card of claim 1, where the card is a wearable device.

5. A card for conducting transactions in connection with delivery devices, the card comprising:
- an electronic bistable display, the display designed to maintain displayed data when the card is without an external electrical power source;
- a microprocessor electrically coupled to the electronic bistable display;
- an embedded secure chip electrically coupled to the microprocessor;
- an antenna coupled to a circuit associated with the microprocessor, the embedded secure chip, and the display, the antenna designed to both (a) interface with the external electrical power source associated with a delivery device to receive electrical power for operating a circuit associated with the embedded secure chip, the microprocessor, and the display, during a contactless transaction and (b) interface with an external data source associated with the delivery device to communicate data during the contactless transaction and to change the displayed data; and
- wherein the card has no internal electrical battery power; and
- wherein the displayed data that is visible on the electronic bistable display, when the card is interfaced with the external electrical power source of the delivery device can be used at a subsequent time for validating a subsequent transaction when the card is no longer interfaced with the external electrical power source and until the card is subsequently interfaced with the external electrical power source and the external data source of the delivery device or another delivery device.

6. The card of claim 5, further comprising an ISO contact plate coupled to the embedded secure chip and the circuit associated with the microprocessor and the display, the ISO contact plate designed to both (a) interface with the external electrical power source to receive electrical power for operating the microprocessor, the display, and the embedded secure chip during a contact transaction and (b) interface with the external data source to communicate data during the contact transaction.

7. The card of claim 5, where the card is a key fob.

8. The card of claim 5, where the card is a wearable device.

9. A card for conducting transactions in connection with a delivery device, the card comprising:
- an electronic bistable display, the display designed to maintain displayed data when the card is without an external electrical power source;
- a microprocessor electrically coupled to the electronic bistable display; and
- an embedded secure chip electrically coupled to the microprocessor;
- an ISO contact plate coupled to the embedded secure chip and the circuit associated with the microprocessor and the display, the ISO contact plate designed to both (a) interface with the external electrical power source associated with a delivery device to receive electrical power for operating the microprocessor, the display, and the embedded secure chip during a contact transaction and (b) interface with an external data source associated with the delivery device to communicate data during the contact transaction and to change the displayed data;
- wherein the card has no internal electrical battery power source; and
- wherein the displayed data that is visible on the electronic bistable display when the card is interfaced with the external electrical power source of the delivery device can be used at a subsequent time for validating a subsequent transaction when the card is no longer interfaced with the external electrical power source and until the card is subsequently interfaced with the external electrical power source and the external data source of the delivery device or another delivery device.

10. The card of claim 9, where the card is a key fob.

11. The card of claim 9, where the card is a wearable device.

* * * * *